Figure 1:
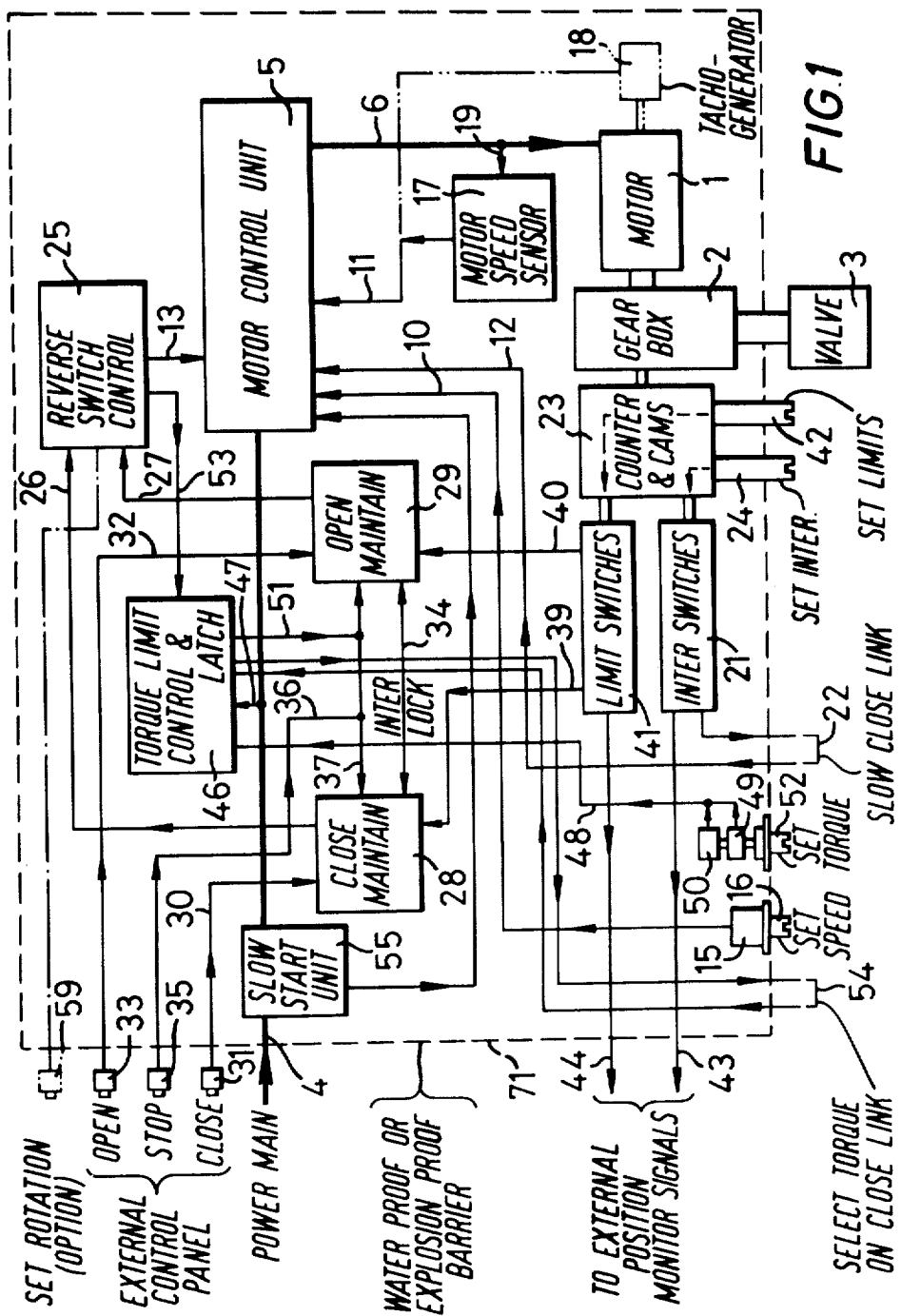

United States Patent [19]

Fry

[11] 4,445,075

[45] Apr. 24, 1984

[54] VALVE ACTUATORS

[75] Inventor: Jeremy J. Fry, Bath, England

[73] Assignee: Rotork Controls Limited, England

[21] Appl. No.: 370,059

[22] Filed: Apr. 20, 1982

[30] Foreign Application Priority Data

Apr. 30, 1981 [GB] United Kingdom ............... 8113310
Mar. 12, 1982 [GB] United Kingdom ............... 8207297

[51] Int. Cl.³ ......................................... H02K 27/30
[52] U.S. Cl. ................................. 318/434; 318/286;
318/282; 318/283; 318/603; 363/129; 363/126
[58] Field of Search ............... 318/10, 282, 283, 286,
318/440, 560, 569, 601, 685, 739, 434, 603;
363/129, 126

[56] References Cited

U.S. PATENT DOCUMENTS

| 3,008,080 | 11/1961 | Storsand | 363/126 |
|---|---|---|---|
| 3,099,777 | 7/1963 | Davis | 318/569 X |
| 3,291,971 | 12/1966 | Dunne | 318/569 |
| 3,322,994 | 5/1967 | Dever et al. | 318/440 X |
| 3,997,826 | 12/1976 | Mayer | 318/739 |
| 4,097,786 | 6/1978 | Lund | 318/282 |
| 4,122,517 | 10/1978 | Hayashi et al. | 363/129 |
| 4,182,126 | 1/1980 | Blakeslee | 318/601 |
| 4,234,833 | 11/1980 | Barrett | 318/286 X |
| 4,364,111 | 12/1982 | Jocz | 318/286 X |
| 4,365,188 | 12/1982 | Walter | 318/739 X |

Primary Examiner—G. Z. Rubinson
Assistant Examiner—Paul Shik Luen Ip
Attorney, Agent, or Firm—Hayes, Davis & Soloway

[57] ABSTRACT

A valve actuator comprises a variable speed motor, a speed control circuit for controlling the motor speed including speed selector means by means of which the desired motor speed can be set to different values by adjustment means. A torque limit control circuit is arranged to stop said motor when a pre-set torque limit has been exceeded. The torque limit control includes a torque sensor arranged to provide a measure of torque from one or more torque-related electrical parameters of the motor for example a torque related current flowing in the motor, and adjustment means for setting torque limit control circuit to different torque limits.

20 Claims, 5 Drawing Figures

VALVE ACTUATORS

This invention relates to valve actuators and particularly to the control aspects of such valve actuators.

The invention is more particularly concerned with relatively large sized valve actuators which even at the smaller end of the range are capable of providing a valve operating torque typically of the order of 3 kg.m and at the larger end of the range are capable of providing a valve operating torque of the order of 1000 kg.m. Such valve actuators find wide application for example in the thermal power generation, gas storage and oil storage industries as well as having marine, penstock and other specialised applications. When such actuators are in use their designed operating speed and torque requirements are very important, as is their back-up control system to ensure safe and reliable operation.

Such valve actuators generally have an output shaft driven by an electric motor through gearing, e.g. worm and worm-wheel gearing, and which can rotate the output shaft in either direction to open or close a valve drivingly connected to the output shaft. Additionally in order to obtain specified speed and torque envelope characteristics a particular motor and a particular gear ratio have to be used and designed into the actuator by the manufacturer and thereafter these characteristics can not be changed without disassembling the actuator. Consequently it has not been possible to provide an "off-the-shelf" actuator suitable for a range of valves requiring different speed and torque characteristics.

It is an object of the present invention to provide an "off-the-shelf" actuator suitable for a range of valves.

According to the present invention there is provided a valve actuator comprising a variable speed motor, a speed control circuit for controlling the motor speed including speed selector means by means of which the motor speed can be set to different values and a torque limit control circuit which is arranged at least for one rotational direction of said motor to stop said motor when a pre-set torque limit is exceeded and which includes a torque sensor arranged to provide a measure of torque from one or more torque-related elctrical parameter of the motor and adjustment means for setting said torque limit control circuit to different torque limits.

By providing a variable speed motor whose speed can be set to different values and an adjustable torque limit control in accordance with the invention, a single motor of suitably high rating and a single gear ratio between the motor shaft and the actuator output shaft can be adapted for use with a range of valves.

The actuator motor is preferably of the kind whose speed is adjustable by varying the input voltage to the motor. Thus the actuator may comprise a motor supplied from a pulsed supply, which can be varied to vary the mean input voltage to and hence the speed of the motor. The motor may be for example a D.C. motor and the pulsed supply a D.C. supply obtained by chopping a continuous D.C. voltage in turn obtained by full wave rectification and optionally smoothing of a single phase or polyphase A.C. supply. The range of control over the pulsed supply may be such that the same range of mean input voltages to the motor and hence the same speed range can be obtained from a wide range of values of A.C. source voltage. For example the control may be such that the same range of mean D.C. input voltages can be obtained from an A.C. source voltage of any value between 250 and 500 volts without affecting substantially the motor speed and torque characteristics.

With such a range of control over the pulsed supply it is possible for the same terminals to be used to connect a 3-phase or single phase supply in the latter case using any two of the three terminals without the need to alter any of the internal circuits.

With such a range of control it is also possible when operating from a 3-phase supply to continue operation when the loss of one of the phases occurs.

Conventionally torque limit control is only exerted in the closing direction of a valve actuator. A further development of the invention is aimed at providing a torque limit control also for the opening direction of the valve actuator, and which is automatically set at the same time as the torque limit control for the closing direction.

The torque limit for opening must always be higher than the torque limit for closing. The two torque limits may differ in a fixed proportion for the whole range of torque limit value. Alternatively they may differ in a varying proportion. For example if the torque limit for closing is set towards the lower end of the torque limit range, then the value of the torque limit for opening would have a relatively higher value than if the torque limit for closing had been set towards the higher end of the torque limit range.

The speed control circuit may be arranged to automatically reduce the motor speed at a predetermined point in its travel of the actuator in either or both directions. Thus speed may be reduced as a valve driven by the actuator is about to seat.

Figure 2:
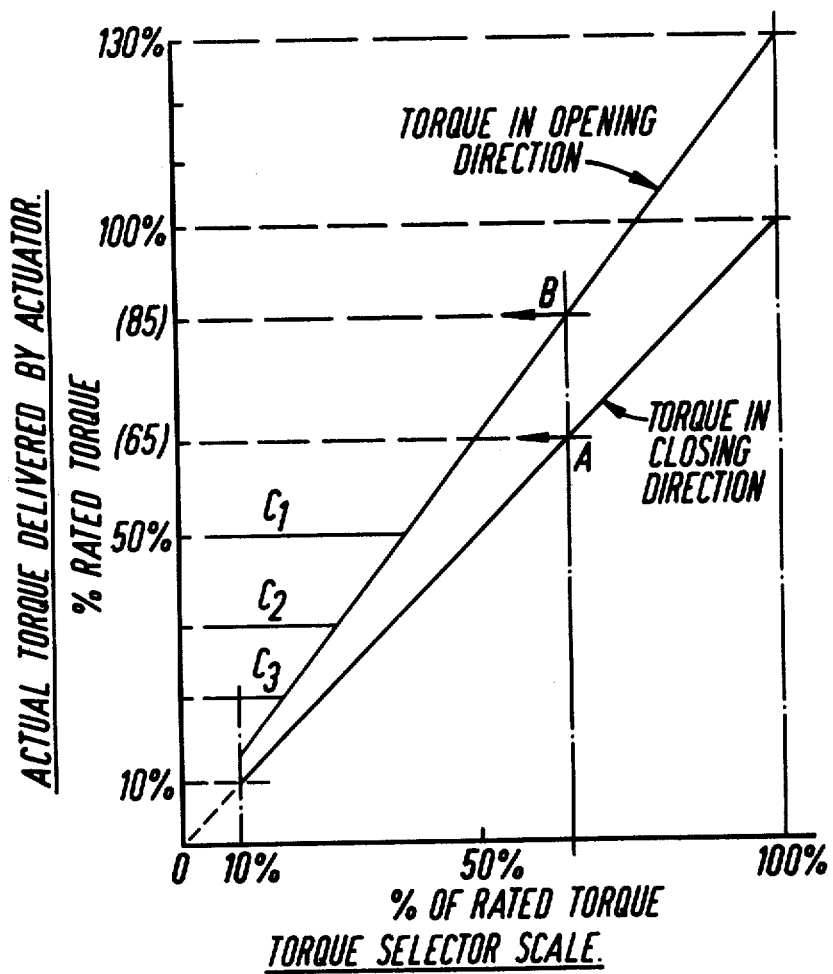
Figure 3:
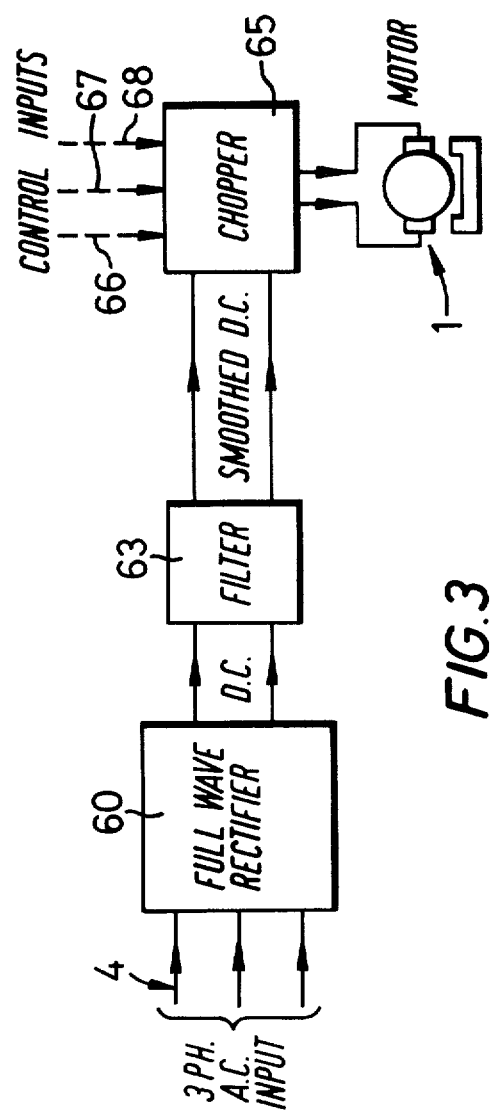
Figure 4:
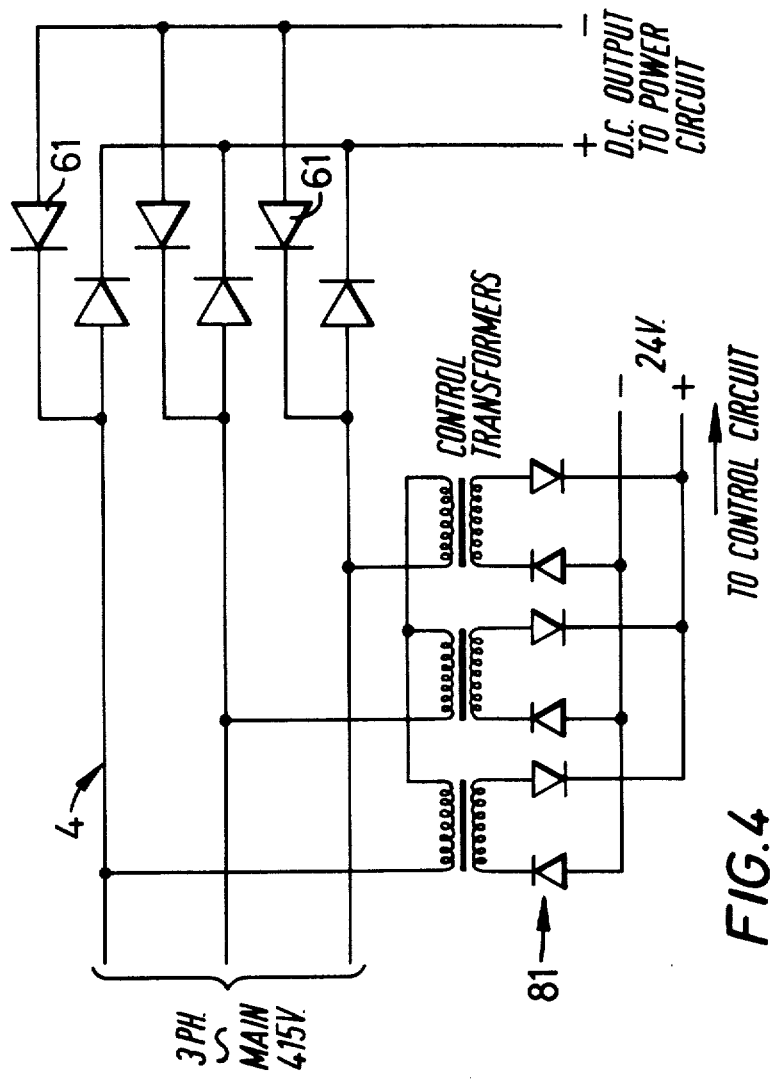
Figure 5:
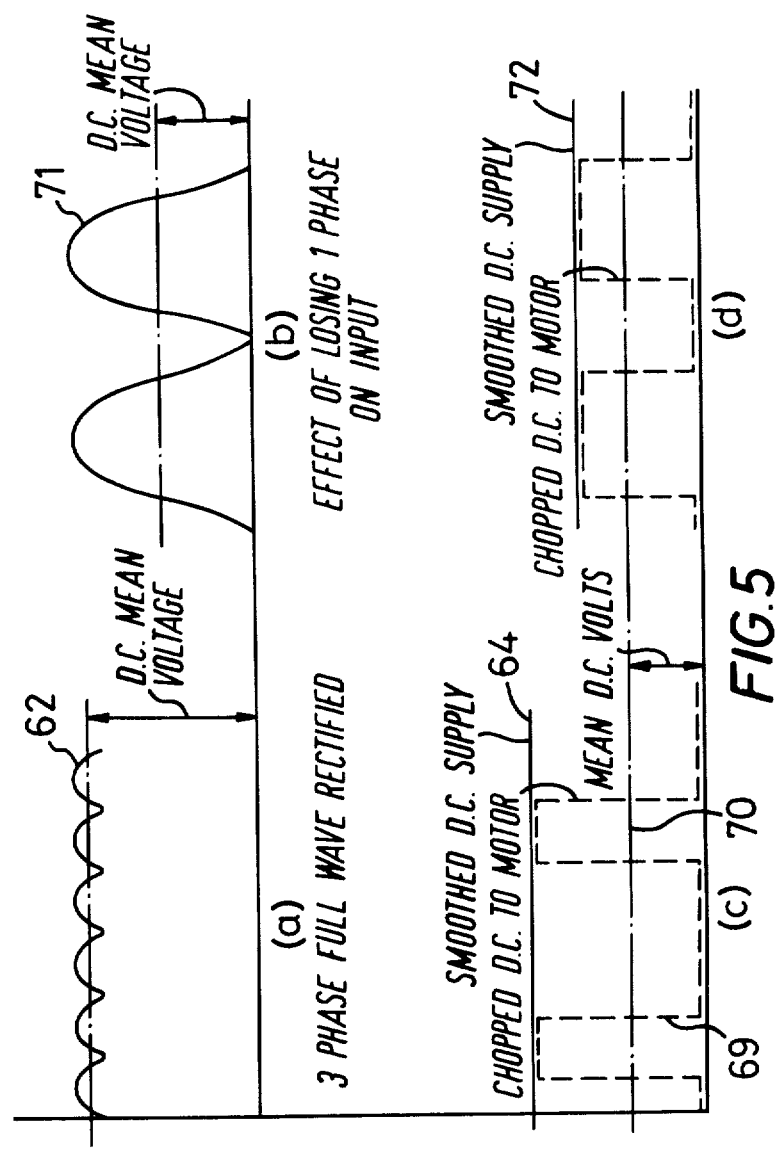

The invention will be described now by way of example with particular reference to the accompanying drawings. In the drawings:

FIG. 1 is a schematic illustration of a valve actuating mechanism according to the present invention, FIG. 2 is a graph illustrating the adjustability of the torque limit control both for the opening and closing direction of the valve actuators, FIG. 3 is a schematic illustration of the power supply system within the actuator, FIG. 4 is a circuit diagram of a part of the power supply system of FIG. 3, and FIG. 5 shows graphically details of the pulsed D.C. input voltage supplied to the actuator motor in relation to the rectified A.C. voltage from which it is derived.

The valve actuator comprises in this example a variable speed direct current (D.C.) motor 1 and a gear box 2 whose output shaft drivingly connects in conventional manner with the spindle of a valve indicated in block form at 3. The motor 1 is supplied from a three-phase power supply through line 4 which leads to a motor control unit 5. As will be described the output from the unit 5 is a pulsed (i.e. chopped) D.C. supply voltage whose pulse width can be varied to provide a variable mean D.C. input voltage to the motor 1. This D.C. supply voltage is connected to the motor by line 6.

The motor control unit 5 has control inputs 10,11,12 and 13. The input 10 leads from a speed setting potentiometer 15 having a manual adjuster 16. Thus a "set speed" reference signal is supplied to the control unit 5 and is adjustable to set the required motor speed to different values by adjustment of the potentiometer 15. The input 11 leads from a motor speed sensor unit 17. Thus an input signal representative of the actual speed of the motor is provided for comparison with the "set speed" signal and if this comparison indicates a deviation from the set speed, the mean D.C. input voltage to the motor 1 is varied to correct the motor speed. The sensor unit 17 is connected by line 19 to detect the back E.M.F. being produced by the motor armature during successive pulses of the D.C. supply and so provide a signal representative of motor speed which is fed via a synchronous switch within unit 17 to the unit 5. Alternatively the input 11 may lead from a tachometer generator 18 as shown in dotted line in FIG. 1 driven by the motor 1.

The input 12 leads from one of the switches of an intermediate switch unit 21 via a "slow close" link 22. The link 22 is either permanently open or permanently closed depending upon the user's requirements. When closed the link 22 completes the input line 12 to the intermediate switch unit 21 to provide the "slow close" facility as will be described and when open this facility is not provided.

Two sets of intermediate switches are provided within unit 21, one set, including the intermediate switch mentioned above, being actuated at a predetermined point near the end of the travel of the valve actuator in the closing direction and the other set being actuated at a predetermined point in the travel of the valve actuator in the opening direction. The actuation of the intermediate switches is effected by a counter mechanism 23, which in conventional manner is driven from the shaft of motor 1 so that its position, i.e. count, at any instant is indicative of the rotation of the actuator output shaft and hence of valve position. The points at which the two sets of intermediate switches are actuated can be adjusted by manual adjuster 24.

Assuming the "slow close" link 22 to be closed, when the aforesaid intermediate switch is actuated near the end of the actuator travel in the closing direction, a signal is provided to control unit 5 via input 12. This input over-rides the "set speed" signal from potentiometer 15 and causes the motor to rotate at predetermined slow speed for the remaining travel of the actuator in the closing direction.

The input 13 leads from a reverse switch circuit 25 and basically controls the direction of rotation of the motor 1. The reverse switch circuit 25 has two control inputs through lines 26 and 27. Line 26 leads from a "close maintain" unit 28 and line 27 leads from an "open maintain" unit 29. The "close maintain" unit 28 has an input line 30 from manually operable "close" switch 31. When the "close" switch 31 is operated an input signal is fed to control unit 5 via "close maintain" circuit 28, reverse switch circuit 25 and input 13 to cause the motor 1 to rotate in the closing direction of the valve actuator. The "close maintain" unit 28 maintains the input circuit to the unit 5 after the "close" switch has been released by the operator. Similarly the "open maintain" unit has an input line 32 from an "open" switch 33. Thus when the "open" switch is momentarily operated, a control input is fed to the control unit 5 via units 29 and 25 and input 13 to cause the motor 1 to rotate in the opening direction of the valve actuator. The rotation of the motor 1 is maintained by the unit 29 after the "open" switch has been released by the operator.

An interlock connection indicated by line 34 is provided between "close maintain" and "open maintain" units 28 and 29 to prevent these units being simultaneously operative. A "stop" switch 35 is connected to the "close" and "open" maintain units, via line 36 which is shown connecting with line 37 between the units 28 and 29. Thus when the "stop" switch 36 is operated, the one of the units 28, 29 which is operative is rendered inoperative to stop the motor 1.

The "close maintain" and the "open maintain" units 28 and 29 have further input lines 39 and 40 respectively from a limit switch unit 41.

Two sets of limit switches are provided within unit 41, a first set being actuated at the limiting position of the actuator in the closing direction and a second set being actuated at the limiting position of the actuator in the opening direction. The actuation of the limit switches is effected by counter mechanism 23 in similar manner to the intermediate switches of unit 21. The points at which the two sets of limit switches are actuated can be adjusted by manual adjuster 42.

Assuming that the "close maintain" unit 28 is operative, when the first set of limit switches is actuated one of these renders the "close maintain" unit 28 inoperative to stop the motor 1. Similarly, assuming that the "open maintain" unit 29 is operative, when the second set of limit switches is actuated, one of these renders the "open maintain" unit 29 inoperative to stop the motor 1.

Lines 43 and 44 are shown leading from the intermediate switch unit 21 and the limit switch unit 41. These are used to feed monitor signals to a remote control station for the valve actuator.

A further inut to the "open maintain" and "close maintain" units 28 and 29 is from a torque limit control and latch unit 46 vai lines 51 and 37. An input 47 to the unit 46 provides a measure of the torque being exerted by the motor 1. The input 47 is derived from the power line 4 and provides a measure of the current being drawn by the motor 1 and hence the torque being exerted by the motor 1.

The torque limit control and latch unit 46 has an input line 48 from a torque limit setting device comprising in this example gauged potentiometers 49 and 50. A manual adjuster 52 is provided for simultaneously adjusting the settings of the potentiometers 49 and 50.

One of the potentiometers 49 and 50 provides a "torque set" signal for the closing direction of the valve actuator and the other of the potentiometers provides a "torque set" signal for the opening direction of the valve actuator. If the motor torque exceeds the set torque limit in either the closing or opening direction of the valve actuator, then the operative one of the "close maintain" and "open maintain" units 28 and 29 is rendered inoperative to stop the motor 1.

A further input is fed to torque limit control and latch unit 46 via line 53 from reverse switch circuit 25, to provide an indication to the unit 46 of the direction in which the motor is rotating so that the appropriate torque limit can be applied.

In FIG. 2 is shown graphically a practical relationship between the torque limits in the closing and opening directions of the valve actuator. The horizontal axis displays the setting of the adjuster 52 and the vertical axis the actual torque that can be developed by the actuator before the torque limit operates. For example at a selected torque of 65% of rated torque the actuator will give the 65% selected in the closing direction (point A) but will give 85% of rated torque in the open direction. A further feature of the torque control is displayed on FIG. 2. At low torque, it will be desirable to provide a higher ratio than the 100/130 typical value because, on small valves the "friction" and "stiction" effort required to shift the valve off its seat is relatively higher than on a large valve. It is proposed therefore, to have an adjustable "cut-off" point for opening torque illustrated by linws $C_1$, $C_2$ or $C_3$ so that the opening torque will never fall below $C_1$ etc., irrespective of the setting of the adjuster 52. Instead of the lines $C_1$, $C_2$ and $C_3$ being horizontal as shown, they could slope.

A "select torque on close" is provided and as in the case of the "slow close" link 22 is either permanently open or permanently closed depending upon the user's requirements. The link 54 when closed (or open depending upon the logic used) connects in appropriate circuitry within unit 46 so that the stopping of the motor 1 in the closing direction of the valve actuator is determined not by the limit switches of unit 41 but by the torque exerted by the motor and hence the force by which a valve is being pressed on to its seating. When the link 54 is open the stopping of the motor 1 is under the control of the limit switches.

Since the torque exerted by the motor during start-up particularly in the opening direction is likely to exceed the set limits, a slow start unit 55 is provided in the power supply line 4. The slow start unit 55 can be operated to limit the current as will be described.

A further optional feature is the "set rotation" switch 59 which provides an input to the reverse switch circuit 25. The "set rotation" switch 59 reverses the effect of the operation of the "close" and "open" switches 31 and 33. Thus in one condition of switch 59, operation of the "close" switch 31 will rotate the motor 1 in a clockwise direction and hence operation of the "open" switch will rotate the motor 1 in the anticlockwise direction. In its other condition operation of the "close" switch will therefore rotate the motor 1 in an anti-clockwise direction. If a user's requirement is that the motor 1 rotate clockwise for closing, the switch 59 is set in one condition and if the requirement is that the motor 1 rotate anticlockwise for closing the switch 59 is set in the other condition. Hence the labelling of the "close" and "open" switches does not have to be changed for the different requirements.

FIG. 3 shows the essential elements of the power supply circuit. The power supply line 4 comprises a three-phase line leading to a full-wave 3-phase rectifier 60 using diodes 61 connected in the usual manner as shown in FIG. 4. The output from the rectifier 60 is of the form illustrated at 62 in FIG. 5(a). This may be passed through a filter 63 to produce a smoothed D.C. output as shown at 64 in FIG. 5(c). The smooth D.C. output is then passed to a "chopper" 65 having control inputs 66, 67 and 68. The effect of the "chopper" 65 is to produce a pulsed rectangular wave-form as shown at 69 in FIG. 5(c). The final mean D.C. voltage indicated at 70 in FIG. 5(c) applied to the motor 1 is determined by the mark-space ratio produced by the chopper circuit as shown in FIG. 5(c).

In utilising this supply system the control parameters are so selected that the mean D.C. voltage at the motor armature can be maintained at a given maximum value or reduced from this maximum value by the speed control system whilst the 3 phase input can vary over the range say 250 to 500 volts (phase to phase).

In the event of one of the phases being lost in the 3 phase supply to the rectifier, the rectifier reverts to a single phase full wave rectifier-the voltage wave now taking the form indicated at 71 in FIG. 5(b). The resulting smoothed D.C. voltage may fall typically to approximately 0.6 times its previous value as indicated at 72 in FIG. 5(d). This fall may be within the range that can be compensated by the chopper circuit 65, the mark-space ratio of the pulsed D.C. supply being altered as shown at 73 in FIG. 5(d) by the control circuit to maintain the mean D.C. voltage as indicated at 70 in FIG. 5(d) at the motor terminals at the same value.

The low voltage supply for the control units shown in FIG. 1, typically 12 to 24 V.D.C., can be obtained from a three-phase transformer/rectifier circuit 81 (FIG. 4), the transformer primaries being connected in star. In order that the control circuit power is not lost, if one of the phases is lost the outputs from the secondary windings are paralleled up after rectification in such a way that the low voltage D.C. control circuit is maintained whichever of the three input phase lines is open-circuited as can be appreciated from FIG. 4.

As illustrated the torque limit control operates by sensing via line 47 the total current passing through the motor this is appropriate to a motor having a permanent magnetic field. It will be appreciated that in the case of a shunt wound motor the system could operate by sensing the armature current in the motor with the field coils connected separately to the supply.

The slow start unit 55 is provided to limit the the current surge to the motor 1 when the motor starts to rotate. The unit 55 prevents a current surge that develops before the motor has built up a back EMF from exceeding the limit values set by the torque limit control unit 46. The unit 55 may also be operative to cause the motor 1 to accelerate slowly from rest thereby giving control over positioning of the valve when using the system in a modulating or regulating capacity.

The motor control unit 5 operates to adjust the mark space ratio of the pulsed D.C. supply so that the mean voltage fed to the motor armature and/or field coil is varied. The speed of the motor is determined by speed sensor 17 and compared with the "set speed" reference voltage. Any deviation of the motor speed due to a load change will alter the back EMF generated to vary the speed signal from sensor 17 to unit 5. The circuit 5 operates to adjust the motor speed so that it remains substantially at the set value.

The reverse switch circuit 25 may include an electromechanical or solid state set of switches or gates arranged to change the polarity of the armature current with respect to the field polarity.

The units 28 and 29 are typically relays or contactors or their solid state equivalents and are provided with the interlock 34 so that it is not possible for both to be operated simultaneously. This interlock can be of an electrical or mechanical form. Each of the units 28 and 29 is so arranged that once the close or open button 31 or 33 has been operated, the motor will continue to rotate until the stop button 35 or the limit switches 41 or the torque limit control and latch 46 is operated.

The intermediate and limit switch units 21 and 41 may be operated by a switch mechanism as described for example in U.K. Patent Specification No. 1 003 761. Alternatively a signal could be derived from an analogue or digital device which records the rotation of the actuator output shaft and compares this with predetermined values for controlling operation of the units 21 and 41.

It will be appreciated that although the motor 1 has been described as being speed controlled by varying the mean D.C. input voltage to it, in accordance with the broad concept of the invention a single phase or polyphase induction motor may be used a solid state rectifier converting the incoming supply to a D.C. voltage and then passing the D.C. supply to an inverter to produce an alternating current of variable frequency in order to speed control the motor.

It will be seen that in the actuator described above a number of manually operable controls 16, 22, 24, 31, 33, 35, 42, 52 and 59. These may be located externally of a housing indicated diagrammatically by dotted line 71 to allow actuator parameters to be adjusted without having to remove the sealed covers for example waterproof or explosion proof covers.

I claim:

1. A valve actuator comprising (i) a variable speed motor, (ii) a speed control circuit for controlling the motor speed said speed control circuit including speed selector means enabling the desired motor speed can be set to different values and first adjustment means for adjusting said speed selector means and (iii) a torque limit control circuit including a torque sensor providing a measure of torque from one or more torque-related electrical parameters of the motor, second adjustment means for setting a torque limit, and means operative to stop the motor at least for one rotational direction of said motor when the torque sensed by said sensor exceeds the torque limit set by said second adjustment means.

2. A valve actuator according to claim 1, wherein said torque sensor provides a measure of torque from a torque related current flowing in the motor.

3. A valve actuator according to claim 1 or 2 wherein said torque sensor controls the speed of the motor by controlling an input voltage to the motor.

4. A valve actuator according to claim 3, wherein a supply circuit is provided for supplying a pulsed voltage to said motor, and said speed control circuit controls said supply whereby motor speed is related to the mean value of said pulsed voltage.

5. A valve actuator according to claim 4, wherein said speed selector means provides a "set speed" signal and means are provided for pruducing an "actual speed" signal representative of actual motor speed and said speed control circuit varies the mean value of said pulsed voltage if the actual motor speed deviates from the set speed.

6. A valve actuator according to claim 4 or 5, wherein a supply circuit includes a full wave rectifier to provide a continuous D.C. voltage from an A.C. supply and from which said pulsed voltage is derived.

7. A valve actuator according to claim 6, wherein said speed control circuit has such a range of control over the pulsed voltage that for the different A.C. input voltages the same mean D.C. voltage can be supplied to the motor.

8. A valve actuator according to claim 7, wherein said range of control over the pulsed voltage is such that if the actuator normally operates on a three phase supply it can also operate satisfactorily on one phase of the same supply.

9. A valve actuator according to claim 8 wherein a voltage source for the control circuits of the actuator is derived from the three-phase supply in such manner that the voltage source is maintained upon loss of any one of the phases of the A.C. supply.

10. A valve actuator according to claim 9 wherein said voltage source for the control circuits of the actuator is a D.C. voltage source derived from the three phase supply through a polyphase transformer the secondary windings and associated rectifiers being connected in parallel so that the D.C. voltage source is maintained upon loss of any one of the phases of the A.C. supply.

11. A valve actuator according to claim 1 wherein said torque-related parameter is compared with a reference parameter in said torque limit control circuit such that when the value of said torque related parameter reaches the reference value the motor is switched off, said reference parameter being set by said adjustment means.

12. A valve actuator according to claim 1 wherein said torque limit control is operative for both direction of motor rotation the value of the torque limit being higher for the opening direction than for the closing direction of the actuator.

13. A valve actuator according to claim 12, wherein the torque limit values for the closing and opening directions of the valve actuator are settable simultaneously by said second adjustment means.

14. A valve actuator according to claim 13 wherein the torque limits for opening and closing are adjusted so that the difference between the opening torque limit and the closing torque limit varies when said adjustment is made.

15. A valve actuator according to claim 13 or 14, wherein said torque limit for opening is controlled such that it will never fall below a predetermined value irrespective of the setting of said second adjustment means.

16. A valve actuator according to claim 1 wherein said torque limit control is rendered ineffective during start-up of the motor.

17. A valve actuator according to claim 1 wherein a current limiting device is arranged to operate during start-up of the motor to prevent the motor current attaining a value at which the torque limit control would be operated and so render the torque limit control ineffective.

18. A valve actuator according to claim 1 wherein said first and second adjustment means are located outside a housing containing said motor and said speed control and torque limit control circuits.

19. A valve actuator according to claim 1 wherein rotation of said motor in one direction is set by a first switch and in the opposite direction by a second switch and a third switch is actuable to reverse the effect of said first and second switches in setting the direction of rotation of said motor.

20. A valve actuator according to claim 1, wherein for a selected direction of rotation of the motor, the speed of the motor at a predetermined position in the travel of the valve actuator is changed to a predetermined lower value irrespective of the setting of said speed selector means and continues at the predetermined value until the end of the travel of the valve in the selected direction.

* * * * *